United States Patent [19]

Barnes

[11] 4,105,439

[45] Aug. 8, 1978

[54] METHOD FOR PRODUCTION OF REFINED STEEL

[75] Inventor: Thomas Malcolm Barnes, Bulter, Pa.

[73] Assignee: Harsco Corporation, Harrisburg, Pa.

[21] Appl. No.: 801,786

[22] Filed: May 31, 1977

[51] Int. Cl.$^2$ .............................. C21B 3/04; C21C 5/00
[52] U.S. Cl. ............................................. 75/51; 75/24; 75/61
[58] Field of Search .......................... 75/24, 51, 61, 46

[56] References Cited

U.S. PATENT DOCUMENTS

| | | | |
|---|---|---|---|
| 3,565,605 | 2/1971 | Vayssiere | 75/51 |
| 3,617,257 | 11/1971 | Rouanet | 75/46 |
| 3,702,695 | 11/1972 | Rouanet | 75/46 |
| 3,734,717 | 5/1973 | Seglin | 75/46 |
| 3,791,819 | 2/1974 | Loutzenhiser | 75/46 |
| 3,985,549 | 10/1976 | Rheinlander | 75/46 |

Primary Examiner—Peter D. Rosenberg
Attorney, Agent, or Firm—Dennis P. Clarke

[57] ABSTRACT

In a method of producing successive heats of refined steel wherein successive charges of molten, impure iron are refined by oxygen in the presence of at least one flux to form molten, refined steel and liquid slag, followed by the separation of said molten, refined steel and liquid slag, the improvement wherein a liquid slag from one of said refining operations is brought into contact with and caused to react with a batch of molten, impure iron which comprises a charge for a subsequent refining operation other than the immediate next successive refining operation to that from which the said liquid slag was obtained, such that at least some of the free and combined iron contained in said slag is substantially reduced and dissolved into said molten, impure iron, and such that the molten, impure iron is at least partially refined.

11 Claims, No Drawings

METHOD FOR PRODUCTION OF REFINED STEEL

BACKGROUND OF THE INVENTION

The production of refined primary steel is usually based upon the refining of molten impure iron, known as hot metal, with oxygen. Typically, one or more jets of gaseous, commercially pure oxygen are impinged upon or blown through the hot metal to oxidize its dissolved impurities. The hot metal is usually produced in a blast furnace by the smelting of iron ores with carbon; or less commonly in a cupola or other melting furnace by the melting of pig iron and scrap. The refining operation is organized in successive batches, called heats.

Refining furnaces for primary steel may be of several configurations, the most common being the upright basic oxygen furnace. There are two principal varieties of the upright basic oxygen furnace: One variety is top-blown through a movable oxygen lance, and the other, known as the Q-BOP, is bottom-blown through submerged oxygen tuyeres. The inclined rotary basic oxygen furnace and the basic open-hearth furnace are less common primary steel refining furnaces. The electric-arc furnace process is normally used to melt and refine secondary steel from scrap, but in some instances may be charged in part with hot metal, or with pre-reduced iron ore, and used as a primary steelmaking furnace.

The impurities commonly found in smelted hot metal from a blast furnace (or in hot metal melted from scrap and pig iron) are carbon, silicon, manganese, sulfur, and phosphorus. Lesser impurities could include aluminum, titanium, and any of the heavy metals, plus dissolved gases such as nitrogen. At high temperatures, and in the presence of a supply of oxygen, the elements aluminum, titanium, silicon, carbon, manganese, and phosphorus may be oxidized appreciably. The oxides thus formed are insoluble in molten iron. Being less dense than the molten iron, such oxides will rise to the top surface of the hot metal as it is being refined. The oxides of carbon, being gaseous, promptly escape into the furnace atmosphere and the exhaust system. Most of the other oxides produced by refining will float as a dross on the surface of the metal. If these oxides are suitably fluxed, they will form a slag that is molten at practical steelmaking temperatures.

The refining of hot metal with oxygen causes the oxidation of a significant portion of the iron together with its impurities. At the conclusion of the refining process, the slag will therefore contain both ferrous and ferric oxides. In general, the concentration of iron oxides in a steel refining slag tends to become higher as the carbon content in the refined primary steel becomes lower.

The sulfur content of the hot metal is initially controlled during smelting to relatively low concentrations. This sulfur may be in part shifted to the refining slag during steelmaking. Slagging and removal of sulfur is facilitated if the slag is constituted (by flux additions) to include a preponderance of lime and/or magnesia such that it is basic in character. (The term basic, as applied to steelmaking slags, denotes an excess of basic oxides, such as lime and magnesia, relative to so-designated acid oxides such as silica and alumina). A strongly basic slag may also assist in the oxidation and removal of phosphorus. Finally, a basic slag helps to limit erosive attack by the slag upon the lining of the refining furnace. The lining consists principally of carbon-bonded periclase or magnesia brick, plus rammed materials made from periclase or other magnesium oxides.

A conventional basic steelmaking practice embodies the use of dead-burned lime as a flux charge. The lime charge is calculated so that the refining slag will attain a final lime-to-silica ratio in the neighborhood of 3:1. Dolomitic (magnesia-bearing) lime is sometimes used to increase the magnesia content of the slag and thereby further limit the erosion of the furnace lining by solution of its magnesia. Fluorspar, calcium fluoride, may be added to the furnace to help a fluid slag to form early in the refining operation.

The final products of oxygen refining as described above are molten refined steel at high temperature, and a covering layer of fluid slag. The refining processes are mainly exothermic, and require the use of scrap steel and/or iron ore in the furnace charge as coolant. This is advantageous in the context of primary steel production, in that modern oxygen steelmaking processes can absorb and recover practically all of the scrap generated during processing of raw primary steel into saleable shapes.

A typical charge to a basic oxygen steelmaking furnace is 65 to 75 percent hot metal and 25 to 35 percent steel scrap. Fluxes are added as required to develop the desired refining slag, and some iron ore may be added late in the heat as a "trimming" coolant. The scrap charge is sometimes preheated to permit its use in larger proportions.

The final temperature of the refined steel is normally 2900° to 3000° F. (1593° to 1649° C). The molten refined steel is generally tapped from beneath the molten slag layer into a refractory-lined receiving ladle. During the tapping of the heat, it is common to add deoxidizing and alloying materials to the receiving ladle. The ladle of refined steel may be taken to a pouring station, or to a separate site for additional treatments such as degassing. Eventually, the molten steel is teemed into ingot molds, or into a continuous casting apparatus.

After the steel has been tapped, the refining slag is poured out of the refining furnace, usually into a slag pot made of cast steel. This slag discharge may also include any molten steel remaining in the furnace, notably as droplets of metal entrained in the slag. The slag is taken to a slag processing area, where it is poured out, cooled, and broken. Such slag is usually processed through a magnetic system to reclaim steel droplets and spillage metal for recycling. The processed slag, after removal of its contained free metal, may be used as a charge to the blast-furnace (smelting) process, which retrieves the iron and manganese values together with useful flux values.

It will be apparent from the foregoing description that the refining slag is regarded as a process waste. Such slag is presently useful only as a source for the secondary and separate recovery of contained metal, by means of magnetic processing and/or re-smelting. All such secondary recovery work is performed after the slag has first been cooled and solidified, at a considerable loss of sensible heat and chemical reaction potential. Yet is is well known that the refining slag is rich in iron oxides and other active oxidizing agents. And it is similarly well known that great advantages could accrue if this liquid slag could be made to react directly with the hot metal as it arrives in the steelmaking plant ready to be refined.

As stated above, the potential benefits of a reaction between fresh hot metal and steel refining slag are well known. To be specific, the reaction was of interest during the early evolution of steelmaking, especially the open-hearth, Bessemer (air pneumatic), and combined ("duplex") processes. Development of these processes was marked by several proposed techniques based upon retaining (in the refining furnace) all or part of the liquid slag from the previous heat. The oxidizing power of the slag was used to partly refine the incoming hot metal, and at the same time the carbon and silicon in the hot metal acted to reduce and recover the contained iron and manganese in the slag.

This principle is recognized in the early patents of Benjamin Talbot, such as U.S. Pat. Nos. 599,290; 688,557; 747,661 and 747,662. Other similar contributions to the art are described in U.S. Pat. Nos. 694,752; 788,650; 898,513; 927,097; 1,137,681; 1,198,827; 1,254,078; 2,111,893; 3,254,987; and Austrian Pat. No. 327,255. It is to be understood that the above list of patents is not intended to be exhaustive; however, it illustrates the origin and development of this aspect of the art of steelmaking.

Rene Perrin, commencing in about 1935, further advanced the general art of slag/metal reaction by developing controlled techniques, including manipulative methods, for bringing molten oxidizing slags together with molten metals containing reducing agents. Perrin's work included pouring metals through slags, pouring metals and slags together from one ladle to another, and simultaneously pouring slag and metal from two ladles into one. His processes are exemplified by present methods for making low-carbon ferrochromium from the reaction between molten chromium silicide and a slag made from chrome ore and lime. These methods and techniques are described in U.S. Pat. Nos. 2,015,691; 2,015,692; 2,123,658; 2,310,865; 2,767,077; 2,767,078; and 2,767,079. In addition, Jean Rouanet obtained U.S. Pat. Nos. 3,617,257 and 3,702,695 for more recent developments in this area. Again, it is to be understood that this list of patents is representative of the development of controlled slag/metal reactions, and is not exhaustive.

Perhaps the closest approach to a practice that could properly utilize the reactive, thermal, and material character of steel refining slag, in modern oxygen steelmaking operations, is described by Ernest Glaesener in U.S. Pat. No. 3,151,976. Glaesener advocated retaining the refining slag in the steelmaking furnace so that it could be reacted with the next incoming charge of fresh hot metal. But, as Glaesener observed, the reaction is explosively rapid under the usual conditions of hot metal charging. Modern basic oxygen steelmaking depends upon a rapid operating pace. Haste is imperative, both for productivity and for prudent thermal and chemical process control. The emphasis on pace usually means that hot metal is poured into the refining furnace as fast as is physically possible; the pouring rates approximate or exceed 100 tons per minute. At this pace of mixing, the reactions between hot metal and refining slag necessarily become violent. This is because the reactions release considerable gas as the reaction product between carbon from the hot metal and oxides from the slag.

Glaesener correctly noted that a slow-paced initial pouring of the hot metal charge would alleviate the explosive tendency, but at a cost in lost time. To solve the problem, he advocated the technique of charging modest amounts of solid, granular reducing agents (such as carbon, or granular pig iron) into the slag ahead of the hot metal. Such reducing agents would pre-react with the slag and somewhat alleviate its initial potential for violent reaction.

The foregoing description of the prior art amply establishes concepts important to an understanding of the present invention. First, it is established by the work of Talbot and others that the expected effects of an induced reaction between hot metal and steel refining slag are known in the practical sense, and are known to be beneficial. Second, it is established by the work of Perrin and others, that the control and management of a reaction between metal and slag is attainable. The applicable arts include pouring metal into and through slag, pouring metal and slag together into a receiving vessel, and/or pouring metal and slag together between two containers. Third, it is established by the work of Glaesener that the implementation of a slag/metal reaction, in the context of modern high-speed basic oxygen steelmaking, is in and of itself a problem in practical operating metallurgy. The development of techniques that circumvent or nullify the basic conflict between the need for close control (on the one hand) and the need for fast overall pace (on the other) is to be desired.

Thus, several steelmakers have tried, on occasion, pouring fresh hot metal into retained refining slag. It was found, however, that the resulting reaction is too violent and dangerous at the usual rapid pace of hot metal charging operations. It was also found that the slow-down of the hot metal charging operations, to compensate for the exothermic character of the slag reaction, results in intolerable losses of time. In summary, none of the workers in this area ever found a way to incorporate the slag/hot metal reaction practically and safely into modern steelmaking practice.

BRIEF DESCRIPTION OF THE INVENTION

It is the substance of this specification that a practical, safe, controlled, and efficient means has been devised for effecting the reaction of refining slag with hot metal. The method is characterized by a degree of control and of time efficiency such that the productivity of a given primary steelmaking operation can, in fact, be increased.

The invention relates to a method of producing successive heats of refined steel wherein successive charges of molten, impure iron are refined by oxygen in the presence of a flux to form molten, refined steel and liquid slag, followed by the separating of the steel and slag.

According to the invention, a liquid slag from one of said refining operations is reacted with a batch of molten iron which is a charge for a subsequent refining operation other than the immediate next successive refining operation to that from which the slag was obtained, such that the iron in the slag is reduced and dissolved into said molten iron and such that the iron is partially refined.

DETAILED DESCRIPTION OF THE INVENTION

The method of the present invention is generally applicable in any steel refining operation characterized by (a) the charging of molten, impure iron (hot metal) from an external smelting or melting source, and (b) the use of gaseous oxygen as the principal reactive agent for refining the charge of hot metal to produce primary steel.

In particular, the method of this invention may be utilized in connection with any of the existing upright or inclined basic oxygen furnace processes, or in any steelmaking apparatus, configuration or application which meets criteria (a) and (b) listed above.

Before proceeding with a description of the preferred embodiments of the invention, it would be well to review what is now known about the metallurgical reactions which comprise the crux of the invention. The principal reactions which form the basis for the method of the invention are described and quantified, for example, in the standard text *Thermochemistry for Steelmaking*, Volumes I and II, by John Elliott et al. In the patent literature, significant contributions to the existing understanding of slag/metal reactions may be found in or inferred from the following U.S. Pat. Nos. 90,111; 416,814; 476,091; 639,872; 639,873; 885,248; 1,028,070; 1,093,892; 1,300,410; 1,423,031; 1,730,960; 2,110,066; 2,110,067; 2,179,167; and 2,350,725. Once again, the foregoing list is intended to be representative, but not necessarily comprehensive.

In a reaction induced between hot metal and the slag from a steel refining operation, the reactive species in the hot metal are considered to be reducing agents. They are, principally, carbon (4 to 5 percent by weight, nominal), silicon (0.3 to 1.8 percent by weight, nominal) and manganese (0.1 to 1.5 percent by weight, nominal). Generally speaking, it is these same three elements that contribute most to the exothermic character of the oxygen steelmaking process. When these elements are oxidized by gaseous oxygen, sufficient surplus energy is released to melt and reclaim significant amounts of scrap. In a batch refining process operated at a fast pace, the heat generated by the oxidation of iron and of phosphorus also contributes positively to the energy balance. By way of contrast, in a slag/hot metal reaction the reactive and energetic role of iron is insignificant since it can react only with ferric oxide; and the phosphorus in the hot metal cannot react at all.

The reactive species in a liquid refining slag are oxidizing agents, principally the oxides of these same elements, excepting carbon. Said reactive species include ferrous oxide, ferric oxide, manganous oxide, and silicon dioxide. During a reaction between hot metal and refining slag, the reactions of carbon from the hot metal will produce a gas. The gas is principally carbon monoxide, with perhaps minor amounts of carbon dioxide. These oxides of carbon may also be considered to be active oxidizing agents, until they physically escape.

The tendency of the multiple reactions between hot metal and steel refining slag is to bring all of the reactive species into thermochemical equilibrium, a state of neutrality governed and determined by the natures and concentrations of the substances present. Equilibrium is also governed by the temperature and pressure of the system. The principal reactions, neglecting those of iron as a reducing agent for ferric oxide, and neglecting the minor role of carbon dioxide, are as follows:

$$\underline{C}^* + Fe_2O_3 \rightleftarrows CO + 2\ \underline{FeO}^{**} \quad (1)$$

$$\underline{C} + \underline{FeO} \rightleftarrows CO + Fe \quad (2)$$

$$\underline{C} + \underline{MnO} \rightleftarrows CO + \underline{Mn} \quad (3)$$

$$2\ \underline{C} + \underline{SiO_2} \rightleftarrows 2\ CO + \underline{Si} \quad (4)$$

$$\underline{Si} + 2\ Fe_2O_3 \rightleftarrows \underline{SiO_2} + 4\ \underline{FeO} \quad (5)$$

$$\underline{Si} + 2\ \underline{FeO} \rightleftarrows \underline{SiO_2} + 2\ Fe \quad (6)$$

$$\underline{Si} + 2\ \underline{MnO} \rightleftarrows \underline{SiO_2} + 2\ \underline{Mn} \quad (7)$$

$$\underline{Mn} + Fe_2O_3 \rightleftarrows \underline{MnO} + 2\ \underline{FeO} \quad (8)$$

$$\underline{Mn} + \underline{FeO} \rightleftarrows \underline{MnO} + Fe \quad (9)$$

$$2\ \underline{Mn} + \underline{SiO_2} \rightleftarrows 2\ \underline{MnO} + \underline{Si} \quad (10)$$

\* Underlining conventionally signifies that the reacting species is in solution in molten ion. Iron itself (Fe) is not underlined, by convention. The oxide species, except the gas CO, are all understood to be in solution in the liquid slag.
\*\* Reactions (1), (2), (5), (6), (8), and (9), involving ferrous oxide (FeO), are inexact as stated because FeO is a non-stoichiometric compound having a ratio of oxygen to iron slightly greater than 1:1 as is suggested by the common formula "FeO."

The reactions above are shown as progressing in either direction. This notation is based on the classic definition of thermochemical equilibrium as the state at which all possible reactions are proceeding at an equal pace in both possible directions. Additional reaction statements could be offered to show the reactions of sulfur and phosphorus in a slag hot metal reaction system, but it is reasonable to generalize as follows concerning these species:

(a) practically all of the available phosphorus will report to the metal, and
(b) the majority of the sulfur will report to the slag, the distribution being governed by the basicity of the slag and by the final temperature.

It may be further generalized that as iron and slag begin to react, reactions (1), (5), and (8) will quickly proceed all the way to the right. The easily reduced species ferric oxide ($Fe_2O_3$) is thus quickly eliminated from the slag.

This leaves seven principal reactions to be satisfied. For analytical purposes, it is necessary and sufficient to select and satisfy any three of the seven reactions, provided that they include all of the principal reactive species remaining in the system. For example, simultaneous equilibrium for reactions (2), (3), and (4) will in fact assure that reactions (6), (7), (9), and (10) are also "satisfied" at equilibrium. This is true because any of the latter four reactions can be stated as a linear combination of reactions (2), (3), and (4). To illustrate, the algebraic addition of reaction (2) to the reverse of reaction (3) yields:

$$\cancel{\underline{C}} + \underline{FeO} + \underline{Mn} + \cancel{CO} \rightleftarrows \cancel{\underline{C}\cancel{O}} + Fe + \underline{MnO} + \cancel{\underline{C}}$$
$$[(2)-(3)]$$

The indicated (/) cancellations of the balanced species C and CO from both sides will leave reaction (9).

The examples to follow will show some representative numerical results of solving the system of reactions (2), (3), and (4) in the specific instance of a low-manganese hot metal reacting with a typical steel refining slag. For the present, however, we may suggest that a minor portion of the silicon in the hot metal reacts to form silica, and that some of the carbon in the hot metal reacts to form carbon oxide gases, principally carbon monoxide. All or most of the iron oxides in the slag are reduced by the actions of carbon and silicon to yield metallic iron. A portion of the manganous oxide in the slag may also be reduced, and nearly all of the phosphorus pentoxide will decompose. Overall, the net effect on the composition of hot metal is to increase its content of iron, manganese, and phosphorus, to deplete it slightly with respect to carbon and silicon and to eliminate most of its sulfur. (Under some conditions. especially early in the reaction, there could be a net oxidation of manganese and a substantial depletion of hot metal silicon.) The slag is correspondingly enriched in sulfur compounds and silicon dioxide, depleted in phosphates and perhaps manganous oxide, and made somewhat less basic. The slag temperature is decreased by transferring heat to the initially cooler metal, and the metal is slightly warmed.

The benefits of the procedure, if brought about in an orderly and controlled manner, are as follows:

(1) The reactions accomplish retrieval of both iron and manganese from the slag at high efficiency. Iron recoveries include metal from spillage and droplets, plus iron reduced from the slag oxides. No subsequent expense is incurred for magnetic processing or for re-smelting of the slag.

(2) The reactions tend to desulfurize the hot metal. This permits operation of the iron smelting furnace with less precise control of hot metal sulfur, and permits production of steels to lower sulfur specifications.

(3) The depletion of hot metal carbon lessens both steel refining time and oxygen requirements. Formation of troublesome kish (graphite released from the iron as it cools) is curtailed.

(4) The process tends to physically strip away and absorb any residual blast-furnace slag from the molten iron. This high-sulfur slag thus cannot enter and contaminate the steel refining furnace.

(5) The silicon content of the hot metal is decreased in variable degree. To the extent of the decrease, a lesser amount of flux may be used in steelmaking, and a lesser volume of slag may be produced at a given degree of basicity. In addition to this effect, the depletion of hot metal sulfur may permit adequate sulfur control in the steel at a significantly lower slag basicity ratio than is otherwise employed. This may further reduce the flux requirement, lessen the slag volume, and make the slag more workable.

The end results, overall, could also include an enlarged practical furnace capacity, an ability to blow oxygen faster without waste or slopping, and much earlier formation of an active, effective refining slag. Other direct and indirect benefits (such as operating advantages in the blast furnace smelting process) will occur to those familiar with the iron- and steelmaking arts.

With respect to benefit (6), centering on the potential for lessened steelmaking slag volume, it is also reasonable to expect a lessening of the weight of iron oxidized during oxygen refining. A strict approach to the thermochemistry of steel refining would suggest a higher refining yield at lower slag volume.

The slag/hot metal reaction is characterized by some limiting side effects which must be recognized and controlled in application. One such side effect is the tendency for phosphorus and manganese to accumulate in the iron in a continuous succession of refining heats and slag-hot metal reactions. These elements are first oxidized out of the hot metal and into the slag during the refining of one charge. They may then be returned from the slag into a subsequent charge of iron during the proposed slag/hot metal reaction. The resulting limitation is similar to that encountered in steel plants that practice extensive re-smelting of steelmaking slag in their blast furnaces, and the remedies and corrective actions are the same:

(1) The input of manganese, phosphorus, and any other species that tends to build up should be minimized by selective purchase of ore and other raw materials for smelting, and, (2) An occasional batch of steel refining slag must be discarded when its expected contributions of such elements might contaminate the hot metal and/or interfere with practical steel refining.

The ability of any given steelworks to benefit from the method of the invention is dependent upon the minimization of present (and future) in-flows of manganese, phosphorus, and other elements which could become troublesome, such as chromium and titanium.

The substance of the present invention lies in the provision of a specific and particular method for inducing, controlling, and completing the desirable reactions between refining slag and hot metal. The method explicitly provides for the benefits of the reactions to be gained without the hazard of violent reaction and without any loss of time. One very significant fault connected with all prior approaches to this desired end, herewith remedied, is that they invariably provided for the reaction of the refining slag from a given newly-completed heat with the hot metal being charged into the very next heat of the operating sequence. It is this faulty practice that created and sustained an insoluble conflict between safety and pace of operations.

A second fault of the prior art, as applied to modern steel refining, is that no provision was offered for the modification of the steelmaking practices to take specific advantage of the benefits of slag/hot metal reactions. This fault is herewith remedied in that explicit means for attaining practical and optimal management of a sequence of steelmaking heats is offered. The explicit methodology is suggested for preparation of a predictive control technique operable within existing steelmaking control methods and systems.

The following describes a typical succession of steel refining operations which incorporates the methods of the present invention.

(1) In a succession of steelmaking heats 1, 2, 3, 4, 5, etc., the final refining slag from heat 1 is poured off in the normal way. The receiving vessel for the slag, however, is a ladle or specialized vessel lined with basic refractory. It may be advantageous to add a mineral flux to this slag to assure its continued fluidity as the iron oxides therein are reduced and as its temperature is lowered.

(2) The slag from heat 1 is brought to the hot metal receiving station where the charging ladles are normally filled, and placed in a position for receiving hot metal. This placement is made immediately after the hot metal for heat 2 has been poured into the hot metal charging ladle.

Subject to clearances, capacities, etc., it is anticipated that the ladle or vessel used to receive the steel refining slag under the refining furnace will be the same as (or similar to) the normal hot metal charging ladle, differing in that (A) it must contain a basic lining, and (B) it must be modified or configured to facilitate the overflow and/or decanting of spent slag after the slag/hot metal reaction. It is preferred that a single ladle or vessel shall serve to (a) receive the fresh slag at the refining furnace, (b) receive the hot metal and contain the resulting reaction, and (c) convey the modified hot metal to the steel refining furnace for charging to a subsequent heat. In the specific version of exemplary practice described below, two such receiving/reacting/charging vessels are required to serve each operating furnace. Continuing:

(3) The hot metal for heat 2 in the succession is charged and refined into steel in the conventional manner. The slag from heat 2 is, as in the case of heat 1, poured off into a specialized, basic-lined ladle or vessel, other than the one that received the slag from heat 1. Flux additions may be made as and if required.

(4) While heat 2 is being refined with oxygen in the steelmaking furnace, the hot metal destined for charging to heat 3 in the succession is poured slowly into and through the retained molten slag from heat 1, initiating and sustaining the desired reactions between hot metal and slag. The pouring-in of iron must be very slow at first, because the initial hot metal will react a majority of its silicon and carbon, giving off carbon oxide gases very rapidly. As the slag is depleted progressively in iron oxides, the rate of hot metal addition may be increased considerably. Time should be allowed, however, for the slag to desulfurize the iron.

It is intended and advantageous that the reacted, spent slag shall be eventually displaced over the edge or spout of the reaction vessel. The displacement is begun after the slag has yielded its contained iron oxide and metallic iron to the hot metal by reaction. Said spent slag may be received in an ordinary slag pot for disposal; it likely bears no values to be retrieved by subsequent processing. No slag should overflow until the reduction of iron oxides is substantially complete, or until the droplets of metal have had time to settle out of the slag and into the iron. When the reactions are apparently complete, the subsequent addition of hot metal and displacement of slag should be more rapid, otherwise the slag (and the incoming hot metal) may be unnecessarily chilled. Continuing:

(5) The operations may continue chainwise; specifically, the slag from heat 1 has now been used to treat hot metal for heat 3 while heat 2 was being refined. Next, the slag from heat 2 should be used to treat hot metal for heat 4 while heat 3 is being refined in the steelmaking furnace. In general, while any heat N is being refined, the slag from heat $(N - 1)$ is being reacted with the hot metal destined for heat $(N + 1)$, N being the second or any subsequent heat of said succession of heats.

In steelmaking operations where two of three steelmaking vessels are used simultaneously, or in two-furnace operations conducted alternately between refining vessels, the chaining practice described in (5) above may not strictly apply. The essence of this portion of my invention and art is to totally decouple the (prior) usage of a given slag to refine and react with the hot metal for the very next heat of the sequence. Any scheduling system that accomplishes this decoupling falls within the meaning and purview of my invention.

The example, in descriptive paragraph (5), proposes that while any given heat of steel "N" is being refined, the refining slag from the next previous heat "N − 1" is to be reacted with the hot metal destined for the next subsequent heat "N + 1." Within limitations of heat conservation and general efficiency, it is envisioned that the slag from any prior heat "N − X" ($X \geq 1$) may be reacted with the hot metal for any subsequent heat "N + Y" ($Y \geq 1$) while heat "N" is being refined, or while any or all of the heats in a series defined by [(N − X + 1), (N − X + 2), ... (N − 1), N, (N + 1), ... (N + Y − 2), (N + Y − 1)] are being refined. As an example, select N to be heat #1777, and suppose X to take the (integer) value 3 and Y to take the value 2. Provided that the slag can be kept fluid, the reaction of the slag from heat #1774 (N−X) may be carried out with the hot metal for heat #1779 (N+Y), during the refining of any or all heats #1775, #1776, #1777 (N) and #1778. It is unlikely (and unnecessary) that a slag/hot metal reaction will "span" four intervening refining operations, as suggested above. The preferred method of the present invention is that the reaction will span one intervening refining operation, as in descriptive paragraph (5). Thus, it is preferred that $X = 1$ and $Y = 1$.

(6) Heats 3, 4 and subsequent heats to be refined from hot metal that has been reacted with slag are made according to a different practice. This practice is to be determined by the usual predictive calculations, supported by an interim analysis of reacted hot metal. In particular, the flux charge may be lessened to conform to the depleted silicon and sulfur in the hot metal. A lesser volume of slag may thus be formed at a lower basicity ratio. The revised practice may also include changes in the balance between scrap and hot metal in the charge. Potentially, changes are expected in the total weight of charge, in the weight of "trimming" ore used as coolant, in the rate of oxygen blowing, and in the sequence of blowing rates and lance heights used.

(7) The changes in practice occasioned by use of a reacted and partially refined hot metal, as described in paragraph (6) above, may lead in consequence to a different final refining slag as respects weight and composition. Such a slag will have a different reaction potential toward the subsequent charge of hot metal it is used to treat. Different results are expected in respect to the final temperature, the amounts of iron and manganese recovered, the desulfurization attained, and the depletion of silicon and carbon.

More specifically, the recommended practice leads to a succession of different steelmaking operations, each planned and executed to make the most of the changing condition of the hot metal. Similarly, there will be a succession of different slag/hot metal reactions, each planned and executed to make the most of the available refining slag. In that particular case described in (5) above, the sequence alternates chainwise: Heats 1, 3, 5, 7, 9, etc., in a series form one succession of heats, and heats 2, 4, 6, 8, 10, etc., form an independent but similar succession.

Any such succession of heats must be ended when the available refining slag is believed to be contaminated. Contamination exists when there is a sufficient concentration of phosphorus, manganese, or any other accumulating element that might make continuation of the succession imprudent. At that instance, one possibility is as follows:

(8) The contaminated refining slag may be reacted with a small amount of hot metal (nominally, a weight of hot metal just sufficient to reduce the slag's contained iron oxides). This weight is roughly equal to the weight of the slag, or from about ½ to 3 times the slag weight. The resulting metal may be poured off as a plate, or as pigs, forming a low-grade but recoverable scrap.

Another possibility is to simply discard the contaminated slag. However, a slag contaminated mainly with manganese should be reacted as in (8), because in the presence of a shortage of hot metal the manganese reaction is in fact reversed and nearly all available manganese will report to the slag. The resulting metal is not at all low in grade.

Calculational methods abound for the planning, prediction, and interim regulation of basic oxygen steelmaking operations. The principles used in the original construction of such methods may be applied to their modification to cover the task of making steel from slag-modified hot metal. The principles used in the original construction of such methods may also be applied to devising additional calculational methods to predict and monitor the effects of the slag/hot metal reactions. The heart of any such method is the algorithm for simultaneously solving the reaction system $$C + FeO \rightleftarrows CO + Fe \qquad (2)$$

$$C + MnO \rightleftarrows CO + Mn \qquad (3)$$

$$2 C + SiO_2 \rightleftarrows 2 CO + Si \qquad (4)$$

adduced in prior discussion as governing the final equilibrium between hot metal and refining slag. To state it another way, a necessary characteristic of the slag/hot metal reaction control method is that it shall predict the thermochemical equilibria among the species carbon, silicon, manganese, and iron, and their oxides. Equilibrium constants, activity data, thermal factors, and other required information are to be found in *Thermochemistry for Steelmaking*, as previously cited. The method will also require means for estimating the behaviour of sulfur, phosphorus, and any element that could accumulate to the detriment of practical steelmaking. The required data are available from the cited reference text.

As is common in present techniques used to control oxygen steelmaking, a checkpoint is needed for the slag/hot metal reaction step. The checkpoint is required so that control predictions may be adjusted appropriately for the subsequent refining and finishing operations. The critical checkpoint data for a reacted, semi-refined hot metal are its temperature and its composition. These data are obtainable by conventional sampling and analytical means. The time frame made possible by decoupling the slag/hot metal reaction from the steel refining operation facilitates such interim analyses. One apparent defect of prior art based on the retention of slag in the refining furnace was that the composition of the resultant refined hot metal was not known. This uncertainty precluded accurate control of steelmaking under prior slag-retention practices.

To provide one numerical example of the contemplated arts and practices, a steelmaking computer program (From Pehlke, Robert D., *Unit Processes of Extractive Metallurgy*, © 1973, Elsevier) used in the instruction of metallurgy students, was used to predict results of refining a succession of five steel refining heats designated 1, 3, 5, 7 and 9, being supposed identical with intervening heats 2, 4, 6, 8 and 10 according to the chaining methods described in item (5) of the preceding process description. A second computer program, constructed from standard equilibrium data for the controlling equations, was used to predict the results of reacting refining slag 1 with inbound hot metal 3, refining slag 3 with inbound hot metal 5, refining slag 5 with inbound hot metal 7, and refining slag 7 with inbound hot metal 9.

This second program also contained suitable algorithms (from standard equilibrium data) for determining the expected partition of sulfur. All of the phosphorus available in the system was assigned to the reacted hot metal. The resulting data are idealized, yet conservative relative to actual practice. In particular, the calculated volume of steelmaking slag, and therefore its content of recoverable iron and its refining potential, is minimized for this example because the scrap charge is assumed to contain no dirt. The example shows an initial slag volume of about 144 pounds per ton of steel, whereas 200 to 250 pounds/ton is common in practice, owing to dirt and blast furnace slag.

The basis assumptions for steelmaking (all five heats) are as follows:

Weight of finished steel, 100 net tons at 2980° F, for each of five heats, less metallic losses.
Steel composition before alloying, about 0.18 percent manganese, 0.13 percent carbon, and 0.01 percent (maximum) sulfur and phosphorus.
Hot metal composition before slag reactions, 0.8 percent silicon, 0.1 percent manganese, 0.01 percent phosphorus, and 4.69 percent carbon at 2580° F.*

* In this example, very low (but practically attainable) input values for manganese and phosphorus content of hot metal are used. The object is to minimize the distortion of computed results as these elements build up in the system.

Metallic (spillage and droplets) losses to refining slag, 800 pounds per refined heat or 8 pounds per ton of steel (0.4%).**

** This allowance is probably understated. Metallic losses to basic oxygen steelmaking slags range from 3 to 10 percent.

It was assumed that the hot metal, whether reacted with slag or not, would lose 80° of (F) temperature in the process of being charged. Similarly, it was assumed that the steelmaking slag would lose 70° of temperature in the process of being poured out and transferred. For heat 1, therefore, the hot metal charging temperature was 2500°, and the first slag taken for reaction with the hot metal for heat 3 was at 2910° (F).
The hot metal for heat 1 was assumed to be separately desulfurized to 0.025 percent sulfur or less; for heat 3 and subsequent heats, the unreacted hot metal was assumed to contain 0.05 percent sulfur initially.
The basicity (calculated charge basis) for steelmaking slag was set at 3.3:1 (lime-to-silica ratio, molar) for heat 1 in the series, and 2.5:1 for subsequent heats in which the hot metal charge contains very little sulfur and essentially no blast-furnace slag.

The following materials-balance data apply to the succession of operations (all data are in units of net tons per 100 net tons raw steel):

TABLE I
MATERIALS BALANCES, STEEL REFINING OPERATIONS

| Refining Heat | Inputs (Net Tons) | | | Outputs | |
|---|---|---|---|---|---|
| | Hot Metal | Steel Scrap | Lime | Refined Steel | Slag |
| 1 | 74.36* | 32.08 | 4.124 | 100.00 | 7.21 |
| 3 | 74.40** | 31.23 | 2.124 | 100.00 | 4.01 |
| 5 | 73.96** | 32.09 | 3.038 | 100.00 | 5.75 |
| 7 | 74.31** | 31.69 | 3.045 | 100.00 | 5.78 |
| 9 | 74.21** | 31.79 | 3.033 | 100.00 | 5.79 |

*As received from the smelting furnace; externally desulfurized
**Weight after reaction with the slag from a prior heat

TABLE II
MATERIALS BALANCES, SLAT/HOT METAL REACTIONS

| Slag From Heat | Metal For Heat | Inputs (Net Tons) | | Outputs (Net Tons) | |
|---|---|---|---|---|---|
| | | Hot Metal | Refining Slag | Modified Hot Metal | Spent Slag |
| 1 | 3 | 73.33 | 7.21 | 74.40 | 6.20 |
| 3 | 5 | 73.20 | 4.01 | 73.96 | 3.25 |
| 5 | 7 | 73.37 | 5.75 | 74.31 | 4.64 |
| 7 | 9 | 73.26 | 5.78 | 74.21 | 4.65 |

TABLE III
COMPOSITIONS OF STEEL REFINING SLAGS
(Before Reacting With Hot Metal)

| Steel Refining Heat | Theoretical Composition, Weight Percent | | | | | | |
|---|---|---|---|---|---|---|---|
| | Lime | Silica | Magnesia | MnO | $P_2O_5$ | FeO | $Fe_2O_3$ |
| 1 | 56.67 | 18.22 | 3.50 | 0.02 | 11.46 | 7.93 | |
| 3 | 52.31 | 22.42 | 3.50 | 0.26 | 0.12 | 11.41 | 7.90 |
| 5 | 52.25 | 22.39 | 3.50 | 0.28 | 0.21 | 11.41 | 7.89 |
| 7 | 52.08 | 22.32 | 3.50 | 0.32 | 0.44 | 11.39 | 7.88 |

TABLE IV
Temperature and Composition of Partly Refined Hot Metal as Charged to Steelmaking

| Charged to Heat | Temperature as charged | Silicon | Manganese | Phosphorus | Sulfur* | Carbon |
|---|---|---|---|---|---|---|
| 3 | 2596 (F) | 0.55 | 0.11 | 0.010 | 0.002 | 4.444 |
| 5 | 2507 | 0.79 | 0.11 | 0.014 | 0.003 | 4.421 |
| 7 | 2508 | 0.79 | 0.11 | 0.022 | 0.002 | 4.318 |
| 9 | 2506 | 0.79 | 0.12 | 0.038 | 0.002 | 4.309 |

*Values are theoretical. Based upon available practical data for desulfurization of hot metal, sulfur levels of 0.008% and lower would be expected in actual practice.

The oxygen and elapsed blowing time requirements for steel refining are of particular interest. The oxygen blowing rate was set at 9000 cubic feet per minute for all cases:

| Refining Heat | Total Oxygen, Cubic Feet | Elapsed Blowing Time, Min: Sec: |
|---|---|---|
| 1 | 150, 150 | 16:41 |
| 3 | 137, 850 | 15:19 |
| 5 | 143, 550 | 15:57 |
| 7 | 141, 600 | 15:44 |
| 9 | 141, 600 | 15:44 |

It will be apparent from the idealized example that manganese and phosphorus tend to build up in the slag, as previously discussed. Yet even if this accrual were so large as to preclude the reaction of heat 5 hot metal with the slag from heat 3 (for prudent refining of heat 5), the benefits of the practice would be substantial. The thermochemical system seems to settle into a steady state as of heats 7 and 9 in the series, after a notable fluctuation of refining slag volume in the earlier heats.

This idealized example is conservative with respect to refining slag volumes and therefore with respect to both recovery and refining effects. Despite this, the following minimum benefits may be derived by comparison of the materials balances for heats 3, 5, 7, and 9, averaged, with the materials balance for baseline heat 1. Ignoring requirements for desulfurizing hot metal for heat 1, the average savings per 100 tons of raw steel are:

Hot metal: 74.36 − 73.29 = 1.07 tons
Scrap: 32.08 − 31.70 = 0.38 tons
Lime: 4.12 − 2.81 = 1.31 tons
Oxygen: 150.15 − 141.15 = 9.00 thousand cubic feet
Time: 16:41 − 15:41 = 1:00 minutes The liquid slag may be contacted with a fluxing agent prior to or during the reaction with molten iron in order to maintain the slag in a liquid state. Suitable fluxing agents include oxides, halides, borates, carbonates, titanates, silicates, etc., of lithium, sodium, potassium, calcium, iron, magnesium, strontium, aluminum, barium, titanium, vanadium, manganese or silicon or a natural earth or industrial composition containing one or more of said fluxing agents.

It will further be understood that additional reactive or refining agents may be introduced at any suitable stage of the process of the invention for the purpose of further refining the iron or modifying the characteristics of the liquid slag. Suitable such agents include chlorine, silicon, ferrosilicon, oxygen, carbon or mixtures thereof.

One or more additional reactive agents may be introduced at any stage of the reaction between liquid slag and iron, whose reaction is enhanced by the natural agitation produced by the primary reaction. Suitable agents include calcium oxide, calcium carbide, sodium carbonate or mixtures thereof.

In an embodiment of the invention slag from a refining operation is collected in a vessel and reacted therein with molten, impure iron. The iron depleted slag is separated from the refined iron by decantation from the vessel and the refined iron is charged to a subsequent refining operation.

As exemplified above, the integration of successive refining operations with the reactions between liquid slag and iron is achieved utilizing calculations embodying algorithims for the estimation of practical mass balances, energy balances and chemical equilibrium for reactions among the species carbon, oxygen, iron, silicon, sulfur, phosphorous, calcium, anganese, and compounds thereof which are present in the reacting phases and in phases resulting from the reactions.

I claim:
1. In a method of producing successive heats of refined steel wherein successive charges of molten, impure iron are refined by oxygen in the presence of at least one flux to form molten, refined steel and liquid slag, followed by the separation of said molten, refined steel and liquid slag, the improvement wherein a liquid slag from one of said refining operations is brought into contact with and caused to react with a batch of molten, impure iron prior to its being charged in a subsequent refining operation, such that at least some of the free and combined iron contained in said slag is substantially reduced and dissolved into said molten, impure iron, and such that the molten, impure iron is at least partially refined prior to being charged in said subsequent refining operation, said successive refining operation being coordinated with said reactions of molten, impure iron with liquid slag such that the molten, impure iron comprising the charge for a refining operation (N + $y$) is reacted with the liquid slag from a prior refining operation (N − $x$) during at least one of the refining operations in the sequence (N − $x$ + 1, . . . , N, . . . , N + $y$ − 1), wherein:

N represents any one of the refining operations in the succession, $x$ is any whole integer equal to or greater than 1 and $y$ is any whole integer equal to or greater than 1.

2. The method of claim 1 wherein said successions of refining operations and of reactions between molten, impure iron and liquid slag are characterized by a succession of refining operations numbered 1, 2, 3, 4, 5, 6, 7, 8, 9, . . . N, wherein the reaction between molten, impure iron and slag follows the schedule:

| Reaction of Molten Impure Iron Comprising a Charge For Heat | With the Liquid Slag From Heat | During the Refining of Heat |
|---|---|---|
| 3 | 1 | 2 |
| 4 | 2 | 3 |
| 5 | 3 | 4 |
| 6 | 4 | 5 |
| 7 | 5 | 6 |
| 8 | 6 | 7 |
| 9 | 7 | 8 |
| . | . | . |
| . | . | . |
| N + 1 | N − 1 | N |

3. The method of claim 1 wherein the succession of reactions between molten, impure iron and liquid slag is terminated by causing an amount of molten, impure iron from about 0.5 to 3 times the weight of liquid slag obtained from any refining operation to react with said slag such that a maximal recovery of iron from said slag occurs together with a maximal degree of refining of said molten, impure iron, the resulting partially refined iron being subsequently charged as part of a charge to a refining operation, or alternatively returned to and added to a reservoir of molten, impure iron, or alternatively cooled or cast and allowed to freeze for subsequent use as a solid charge to a refining operation.

4. The method of claim 1 wherein said liquid slag is contacted with a fluxing agent prior to or during said reaction thereof with said molten, impure iron, for the purpose of maintaining said slag in a liquid state.

5. The method of claim 1 including the steps of:
(a) collecting the slag from a refining operation in a vessel, p1 (b) contacting and reacting said slag with molten, impure iron in said vessel,
(c) separating the iron-depleted slag from at least partially refined molten, impure iron by decantation of said slag from said vessel, and
(d) charging said at least partially refined molten, impure iron as a charge to a subsequent refining operation from said vessel.

6. The method of claim 1 wherein the integration of successive refining operations with the said reactions between liquid slag and molten, impure iron is attained by the use of calculations embodying algorithms for the estimation of practial mass balances, energy balances, and chemical equilibria for reactions among the species carbon, oxygen, iron, silicon, sulfur, phosphorus, calcium, manganese, and compounds thereof which are present in the reacting phases and in phases resulting from said reactions.

7. The method of claim 1 wherein one or more additional reactive agents is introduced prior to or during said reaction between liquid basic slag and molten, impure iron for the purpose of utilizing the agitation inherent in said reaction or the changes consequent upon said reaction to augment the reactive behavior of said reactive agents toward the molten, impure iron.

8. The method of claim 1 wherein one or more additional reactive agents is introduced prior to, during, or subsequent to said reaction between liquid basic slag and molten, impure iron for the purpose of further refining the molten, impure iron or modifying the characteristics of the liquid slag.

9. The method of claim 5 wherein said fluxing agent is an oxide, halide, borate, carbonate, titanate, or silicate of lithium, sodium, potassium, calcium, iron, mangasium, strontium, aluminum, barium, titanium, vanadium, manganese or silicon; or a natural earth or industrial composition containing one or more of said fluxing agents.

10. The method of claim 7 wherein said reactive agent is calcium oxide, calcium carbide, sodium carbonate or mixtures thereof.

11. The method of claim 8 wherein said reactive agent is chlorine, silicon, ferrosilicon, oxygen, carbon, or mixtures thereof.

* * * * *

UNITED STATES PATENT AND TRADEMARK OFFICE
CERTIFICATE OF CORRECTION

PATENT NO. : 4,105,439
DATED : August 8, 1978
INVENTOR(S) : THOMAS MALCOLM BARNES It is certified that error appears in the above-identified patent and that said Letters Patent are hereby corrected as shown below:

Column 16, lines 3-6, claim 5 should read:

"5. The method of claim 1 including the steps of:

(a) collecting the slag from a refining operation in a vessel, (b) contacting and reacting said slag with molten, impure iron in said vessel, - - -".

Signed and Sealed this

Twenty-seventh Day of February 1979

[SEAL]

Attest:

RUTH C. MASON
Attesting Officer

DONALD W. BANNER
Commissioner of Patents and Trademarks